United States Patent [19]

Kellar

[11] 4,152,719
[45] May 1, 1979

[54] VIDEO PICTURE COMPRESSION

[75] Inventor: Paul R. N. Kellar, Abingdon, England

[73] Assignee: Quantel Limited, Berkshire, England

[21] Appl. No.: 798,513

[22] Filed: May 19, 1977

[30] Foreign Application Priority Data

May 21, 1976 [GB] United Kingdom ............... 21024/76

[51] Int. Cl.$^2$ ........................................... H04N 9/535
[52] U.S. Cl. .................................................. 358/22
[58] Field of Search ....................... 358/22, 11, 180, 4, 358/13

[56] References Cited

PUBLICATIONS

Bruch, "Transcoder PAL-NTSC . . . ", Telefunken-Zeitung, Jg. 37 (1964), Heft 2, pp. 115 and 131.

Primary Examiner—John C. Martin
Attorney, Agent, or Firm—Dowell & Dowell

[57] ABSTRACT

A video compressor including an analogue to digital converter for sampling an incoming video signal, a store for holding the sampled signal and a digital to analogue converter for reconverting the stored signal into analogue form.

A processor is provided for processing the video signal prior to conversion and storage. The processor includes means for reducing the frequency of a line locked subcarrier waveform and means for maintaining the correct subcarrier line to line phasing whereby when predetermined ones of the samples are retained by the store, a compressed picture having correct phase and subcarrier relationships is provided.

11 Claims, 4 Drawing Figures

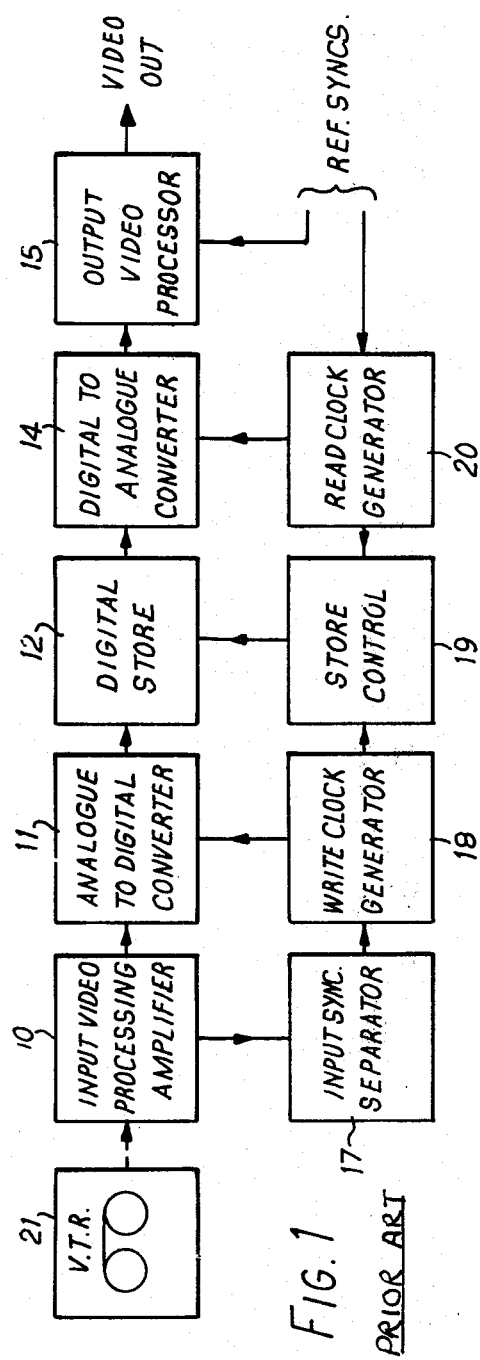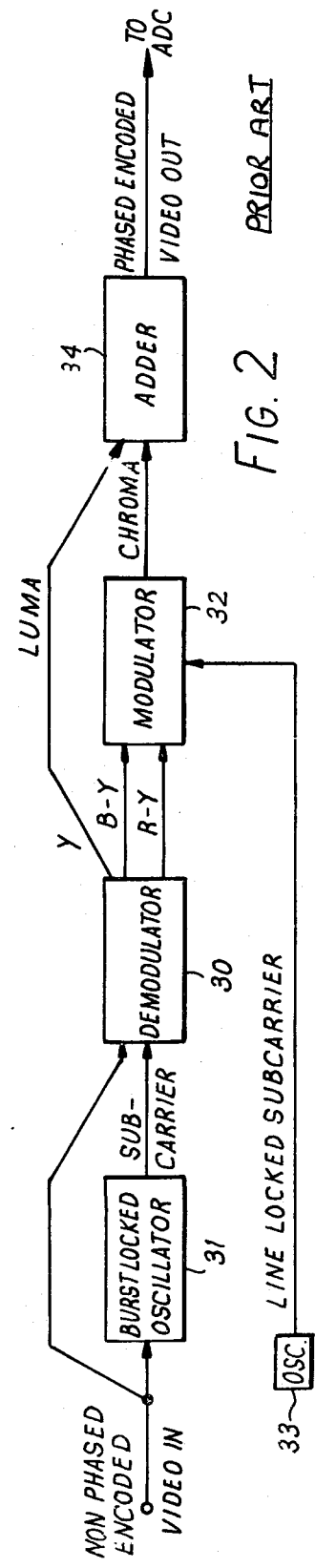

VIDEO PICTURE COMPRESSION

BACKGROUND TO THE INVENTION

The invention relates to the compression of a colour encoded picture using digital techniques including storage means as for example a frame store.

Digital storage techniques are well known in the television art as in time base correctors (e.g. see British Pat. No. 1,465,314 and U.S. Pat. No. 3,978,519). If the store is greatly expanded to allow a whole frame to be captured (i.e. a frame store synchroniser) then the store control must also be expanded to handle the necessary picture point addressing and sequencing. A frame store is disclosed in British patent application No. 6585/76 and U.S. patent application Ser. No. 764,148 A synchroniser incorporating a frame store is described in British patent application No. 6588/76 (U.S. Patent Application Ser. No. 769,615, now U.S. Pat. No. 4,101,939).

If a monochrome system is devised where a digitally encoded signal is read into a framestone that is capable of asynchronous action reading its content to a display at a rate dictated by the display timing waveforms, and if, on the input, the addresses were so modified that every alternate picture point along the line the address was not advanced, the net result would be that after a complete line only half of the normal store allocations for this line will have been filled. The output examining the contents of the store in the normal way, will therefore see an image compressed horizontally to half its original size.

If the same is done in the line direction so that the line address counters are only advanced every alternate line, the result will be a picture of half the original height. Performing these two functions together therefore creates a quarter size picture.

Whilst in monochrome this technique will look quite good there will be a number of flaws, firstly in the horizontal direction a very thin vertical line that occupied a picture point that the address counter has ignored will not be present on the output picture. However, if the camera pans sideways, this very thin line will alternately appear and disappear as it moves across cells that have been examined by the input circuitry and cells that have been ignored. This problem can be overcome on the input by including a suitable filter that has a time constant equal to two picture points. In this way vertical lines on the picture that are only one picture point wide in fact will appear at half amplitude but will not twinkle as the camera is panned.

The problem in the vertical direction is more complex to overcome but can be achieved by a line interpolator effectively adding one line to the next and dividing by two prior to entering the store. Using this technique it can be demonstrated that a seemingly perfect quarter sized compressed picture can be generated. Furthermore the technique can be extended to include variable sizes between full size and any tiny picture.

When attempting to operate with encoded colour, realisation of a suitable compressor becomes more difficult. Consider in the horizontal direction what will happen if 'one picture point on — one picture point off' were used. The normal sampling frequency for NTSC colour is three times colour sub-carrier and, therefore, taking 'one picture point on — one picture point off' would completely alter or destroy the sub-information. A technique that maintains the hue correct and does not corrupt the sub-carrier is, instead of entering one picture point into the store and ignoring the next, is to enter three consecutive picture points and to ignore the next three consecutive points. This results in quarter size pictures, as before and gives the correct hue but suffers very badly from problems associated with interpolation since now a line three picture points wide will appear and disappear as it is moved across the input field of view. Avoiding this effect is difficult and although interpolation is possible the result is a picture of greatly reduced bandwidth.

The problem in the vertical direction is similar since the phase of sub-carrier is inverted line to line, if sub-carrier phase is to be maintained correctly then two consecutive lines must be used, the next two consecutive lines ignored and so on. The net result of the vertical and horizontal operation is a picture that is quite unacceptable containing what appears to look like cells, that twinkle as the camera is panned, and sloping edges on the picture appear with a staircase type effect.

OBJECT OF THE INVENTION

An object of the present invention is to remove these unwanted effects from the picture. In the embodiment to be described it is possible to maintain a three times sub-carrier sampling system.

SUMMARY OF THE INVENTION

According to the invention there is provided a video processor for allowing picture compression to be achieved, including means for providing a reduced frequency subcarrier waveform having the same line relationship as an original subcarrier waveform; and means for maintaining correct subcarrier line to line phasing.

Preferably filtering of the luminance signal is provided prior to adding to the chrominance signal.

Further according to the invention there is provided a video compressor having an analogue to digital converter for sampling an incoming video signal, storage means for holding the sampled signal and a digital to analogue converter for reconverting the stored signal into analogue form, the provision of:

Processor means for processing the video signal prior to conversion and storage, said processor means including means for providing a reduced frequency subcarrier waveform having the same line relationship as an original subcarrier waveform and means for maintaining the correct subcarrier line to line phasing whereby when predetermined ones of said samples are retained by said storage means a compressed picture having correct phase and subcarrier relationships is provided. In a further aspect of the invention there is provided a method of compressing a video picture including the steps of providing a reduced frequency sub-carrier waveform having the same line relationship as an original subcarrier waveform to provide a video signal of lower frequency, changing the line to line phase relationship of at least some of the lines of said video signal, sampling the video signal and converting said signal into digital form, entering said samples in digital form into a store having a plurality of locations such that only predetermined ones of said samples are retained in successive locations, whereby on reading out of said digital information from said store a compressed video picture is produced.

DESCRIPTION OF PREFERRED EMBODIMENT

The invention will now be described by way of example with reference to the accompanying drawings in which:

FIG. 1 shows a typical arrangement for conversion, storage and reconversion of a video signal to provide for example time base correction;

FIG. 2 shows an arrangement for a known non-phase processor;

Figure 3:
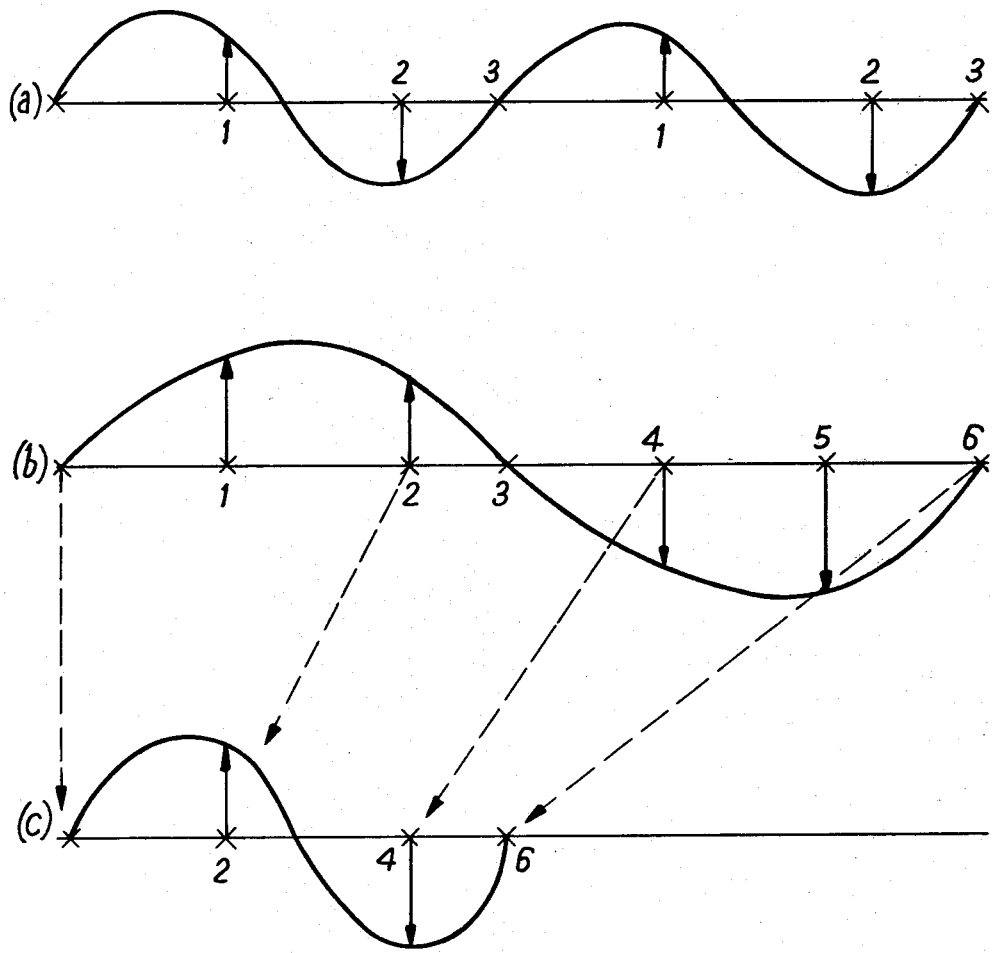
FIG. 3 shows sampling of sub-carrier waveforms for the known arrangement in comparison with the novel system.

The arrangement of FIG. 1 shows a typical arrangement for conversion, storage and reconversion of a video signal to provide, for example, time base correction and includes an input processor 10. This processor acts as a buffer to the incoming video signal and may effect filtering and other modifications to the signal in dependence on what type of video signal is being handled.

The processing of non phased colour signals is described in more detail below.

The video signal received by the analogue-to-digital converter 11 is converted into digital form. The principle of time base correction involves the writing and reading of the digital data into and out of the store 12 at different clock rates. Input video data is written into the store under the control of a write clock generator 18 locked to the sync information on the incoming signal received via separator 17 and may also be locked in relation to colour subcarrier burst. Read out of the data from the store is under the control of a read clock generator 20 receiving reference synchronising information from an external source or an internal stable sync pulse generator. The addressing and sequencing of the store is effected by control 19. The data from the store is reconverted to analogue form by converter 14 and passes via processor 15 to the output. Processor 15 allows new sync and burst information to be inserted in the video signal. The signal to be corrected is shown as being received from a video tape recorder 21.

If the store is expanded to allow a whole frame to be accommodated then the store control is also expanded to provide the required addressing and cycling of the store. As described in more detail in British patent application No. 6588/76 and U.S. patent application Ser. No. 769,615 mentioned above, the frame store and control must be capable of handling several hundred lines of video information.

The store control includes address counters for addressing the various memory addresses within the frame store for a read or write cycle and timing control for producing timing signals for addressing the memory elements at the correct point in time. The frame store disclosed in British patent application No. 6585/76 (U.S. patent application Ser. No. 764,148) is constructed from known 64 × 64 bit memory chips (i.e. 4096 by 1 bit) which bit locations are accessed by entering row and column address information from the store control as an 18 bit address derived from picture point counters. As the 4096 random access memory chip is dynamic, a refresh cycle must also be effected to retain the stored data. Refresh address counters are therefore included. For example, a store using 16 cards each containing 32 RAM chips would provide a framestore of 256 × 512 words 8 bits wide to allow 512 video lines each of 512 picture points to be stored.

Timebase correctors or synchronizers with an integral timebase corrector, if they are to handle colour information coming from a heterodyne taperecorder have to operate in a non-phase mode. That is to say they have to handle a signal whose colour sub-carrier no longer has any relationship to the line frequency. The circuit shown in FIG. 2 is of a typical non-phased processor. Video entering the system is fed to both a demodulator 30 and a burst locked oscillator 31. The burst locked oscillator 31 produces a sub-carrier signal which is locked to the sub-carrier relevant to the input video. This sub-carrier is used to demodulate the chroma information from the encoded video and produce Y (luminance), R-Y and B-Y. R-Y and B-Y are fed into a separate modulator 32 that has its other input a specially generated line locked sub-carrier from oscillator 33. The resultant output from modulator 32 is a chroma signal that is correctly phased and line locked. If this is added to the original luminance signal coming from the demodulator in an added 34 then encoded video results at the adder output that is phased having a sub-carrier whose frequency is correctly line related. This signal can go into a conventional digital encoding circuit (see FIG. 1) and be processed in the normal way.

HALF SUB-CARRIER MODULATION

To provide compression it is necessary to produce a system that enables the colour sub-carrier to be coped with in a 'one picture point on — one picture point off' configuration, and 'a one line on — one line off' configuration. As has already been described, any attempt to do this directly on the sub-carrier corrupts it beyond recovery.

FIG. 3(a) shows sub-carrier cycles with three samples per cycle (i.e. taken at three times sub-carrier frequency). FIG. 3(b) shows a cycle of half sub-carrier frequency but still with three times sub-carrier sampling. If every alternate sample is taken and reconstructed in a similar way to the way the compressor handles the signal in the 'one on — one off mode', it will be clear from FIG. 3(c) that the result is a sub-carrier cycle of the correct hue and amplitude, even though 'one picture point on — one picture point off' sampling has been achieved.

Figure 4:
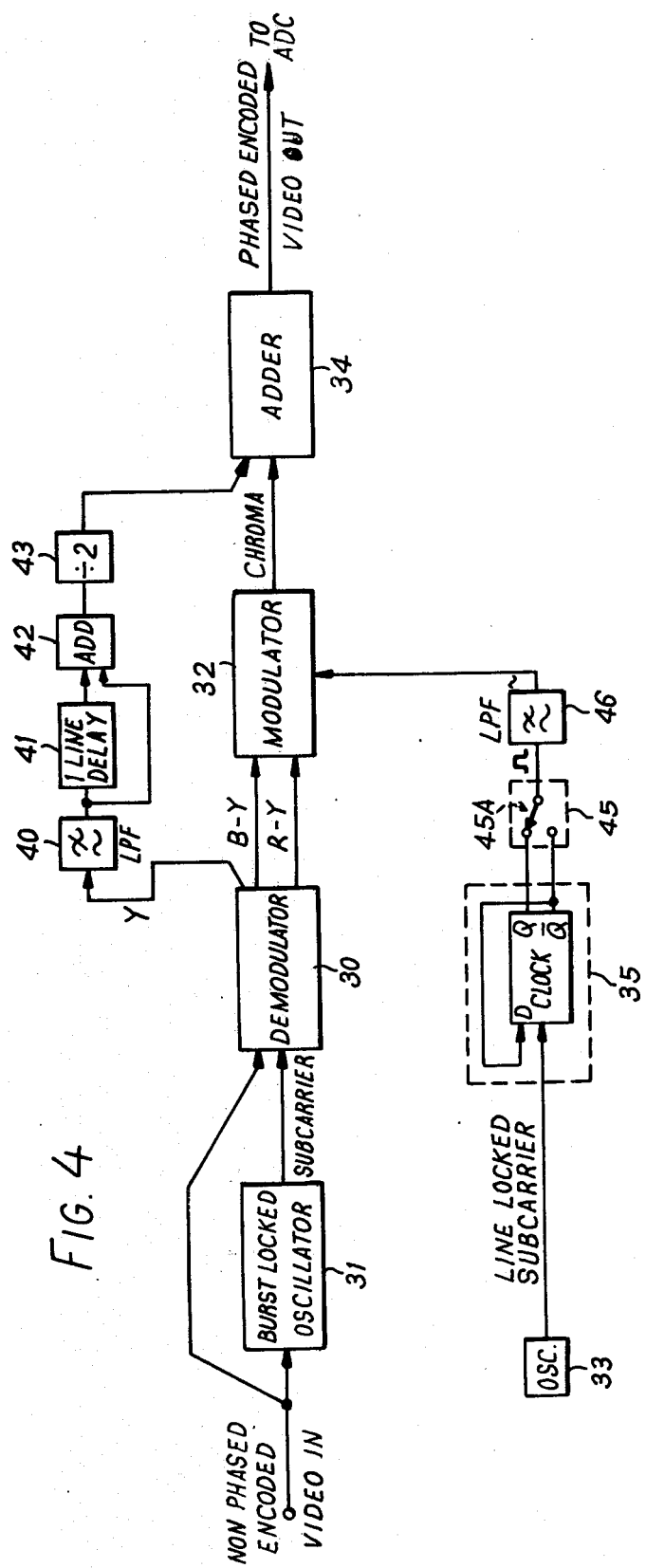
FIG. 4 shows an embodiment of the processor of the invention which allows quarter size picture compression to be achieved.

An example of how to achieve this can be seen in the novel non-phased processor shown in FIG. 4. It has already been shown in FIG. 2 how the R-Y and B-Y signals are demodulated by a burst locked oscillator 31 and demodulator 30 and then remodulated with line locked sub-carrier in modulator 32. In order to change the frequency of sub-carrier it is necessary instead of remodulating with line locked sub-carrier, to remodulate the signal with line locked half sub-carrier. This half sub-carrier frequency is provided by divide by two circuit 35 which halves the frequency from oscillator 33. This divider is shown as a D type flip flop but could be any suitable element. In the normal NTSC colour signal the chroma is of low bandwidth and therefore it does not require any further filtering to achieve a perfect picture from 'one picture point on — one picture point off' sampling. However, luminance is of high bandwidth and separate filtering is included in the luminance line prior to adding the luminance back onto the chrominance. This filtering comprises low pass filter 40, 1 line delay 41, adder 42 and divide by two circuit 43.

SUB-CARRIER INVERSION FOR VERTICAL COMPRESSION

It was shown before that with a normal sub-carrier inverting line to line then two consecutive lines have to be taken into store and the next two consecutive lines ignored if the sub-carrier relationship is to be maintained. The 'one line on — one life off' entry into the store can be achieved by inverting the phase of the line locked half sub-carrier frequency remodulating chroma. This phase inversion is effected by means of switch 45 which is arranged to alternate between the Q and Q̄ positions of flip flop 35, so that it changes position every other line. Thus the phase changes by 180° every other line. Switch 45 could be of solid state construction and receive an input signal at 45A to effect change over during the horizontal blanking interval which signal may be conveniently derived from the write clock generator or the store control of FIG. 1. The square wave output from switch 45 is converted by low pass filter 46 to a substantially sine wave before reaching the modulator 32. An examination of the waveforms will show that the sub-carrier relationship is correctly maintained.

As explained above to achieve the compression one picture point sample is stored whilst the next is not. Alternatively the next sample is stored in the same location as the first so that the first sample is lost. By providing a divide by two circuit for example to the input to the picture point counters the samples at the store will be received as normal whilst the counters will be incremented at half the normal rate to give the required compression. Thus the compression technique described reduces the picture to one quarter the size of the original and results in no degradation of the image quality by keeping interpolation errors to the minimum and by maintaining the phase of the sub-carrier correct on a line to line basis.

The examples given here have been for a quarter size compressor, however there is no reason for limiting this technique to one quarter size and for example when remodulating with one third sub-carrier frequency it can be shown that by taking 'one picture on — two picture points off' that a one third size picture can be produced. Similarly many other combinations are possible.

The burst locked oscillator and demodulator has been described since it is convenient for working from a heterodyne taperecorder, however, there are many other techniques for achieving the half sub-carrier remodulation, chroma can be separated in the conventional manner using standard NTSC decoding techniques, or the encoded signal can be mixed with a different carrier to allow the selection of half sub-carrier.

Although the embodiment of FIG. 4 shows the means for providing the reduced frequency subcarrier waveform as a divider connected to an oscillator generating a line locked subcarrier it is possible to replace these by an arrangement in which the reduced frequency is produced directly but in such an arrangement the correct line relationship to the original subcarrier must still be maintained.

Although the description has related mainly to a picture compressor involving a framestore, the techniques have equal applicability in any digital processing system equipped with either a line store, a framestore or indeed even only a few picture points of storage.

I claim:

1. A video compressor for allowing picture compression to be achieved on an incoming video signal which signal includes a colour subcarrier waveform, said compressor including means for providing a colour subcarrier waveform having a reduced frequency relative to the incoming colour subcarrier and having a corresponding phase relationship to the incoming subcarrier waveform, means for modulating the chrominance component of the incoming video signal with the reduced frequency subcarrier to provide a modified video signal, digital storage means for storing selected digital samples of the modified video signal, and means for changing the phase of the reduced frequency colour subcarrier on selected lines to maintain correct subcarrier line to line phasing when the modified video signal is read out from the store.

2. A video processor according to claim 1 wherein separator means are provided to separate the luminance component from the chrominance component of the input video signal and filter means are provided for filtering the luminance signal.

3. A video processor according to claim 2 wherein adder means are provided for adding the modulated chrominance signal to the filtered luminance signal.

4. A video processor according to claim 1 wherein the means for providing a reduced frequency colour subcarrier waveform comprises a divider and the means for changing the phasing of the colour subcarrier comprising switching means operable at line frequency.

5. A video processor according to claim 4 wherein a low pass filter is provided at the output of said switching means.

6. A video processor according to claim 2 wherein said separator means comprises an oscillator locked to the colour subcarrier burst on the incoming video signal and a demodulator for demodulating the chrominance signal under the control of the oscillator locked to the colour burst.

7. A video processor according to claim 2 wherein said filter means comprises a low pass filter having an output connected to an input of a 1 line delay and to a first input of an adder circuit; an output of the delay being connected to a second input of the adder circuit; and a divide by two circuit connected to the output of the adder circuit.

8. In a video compressor having an analogue to digital converter for sampling an incoming video signal which includes a colour subcarrier waveform, storage means for holding the sampled signal and a digital to analogue converter for reconverting the stored signal into analogue form, the provision of: processor means for processing the video signal prior to conversion and storage, said processor means including means for providing a colour subcarrier waveform having a reduced frequency relative to the incoming colour subcarrier and having a corresponding phase relationship to the incoming subcarrier waveform, means for modulating the chrominance component of the incoming video signal with the reduced frequency subcarrier to provide a modified video signal, and means for changing the phase of the colour subcarrier on selected lines whereby when predetermined ones of said samples of the modified video signal are retained by said storage means a compressed picture having correct phase and subcarrier relationships is provided when read out from said store.

9. A method of compressing a video picture including the steps of providing a colour subcarrier waveform having a reduced frequency relative to the incoming colour subcarrier and having a corresponding phase relationship to the incoming subcarrier waveform, modulating the chrominance component of the incoming video signal with the reduced frequency subcarrier to provide a modified video signal, changing the line to line phase relationship of at least some of the lines of said video signal, sampling the modified video signal and converting said signal into digital form, entering said samples in digital form into a store having a plurality of locations such that only predetermined ones of said samples are retained in successive locations, whereby on reading out of said digital information from said store a compressed video picture is produced.

10. A method of comprising a video picture according to claim 9 including the steps of separating the luminance component from the chrominance component of the video signal and filtering the luminance component prior to sampling the video signal.

11. A method of compressing a video picture according to claim 10 including adding the modulated chrominance signal to the filtered luminance signal prior to sampling.

* * * * *